United States Patent [19]

Busby et al.

[11] Patent Number: 5,943,630
[45] Date of Patent: Aug. 24, 1999

[54] DISPLAY SYSTEM FOR REMOTE WEATHER CONDITIONS

[75] Inventors: Bryan T. Busby, Overland Park; James D. Duey, Olathe; Carl A. Foster, II, Kansas City, all of Kans.

[73] Assignee: Weather Computation Systems, L.C., Lenexa, Kans.

[21] Appl. No.: 08/795,991

[22] Filed: Feb. 5, 1997

[51] Int. Cl.[6] .................................................. G06F 19/00
[52] U.S. Cl. .................................................................. 702/3
[58] Field of Search .......................................... 702/3, 4

[56] References Cited

U.S. PATENT DOCUMENTS

| | | | |
|---|---|---|---|
| 4,230,989 | 10/1980 | Buehrle | 375/214 |
| 4,277,845 | 7/1981 | Smith et al. | 455/505 |
| 5,019,977 | 5/1991 | LaPointe et al. | |
| 5,023,934 | 6/1991 | Wheeless | |
| 5,117,359 | 5/1992 | Eccles | |
| 5,390,237 | 2/1995 | Hoffman, Jr. et al. | |
| 5,568,385 | 10/1996 | Shelton | |

*Primary Examiner*—Donald E. McElheny, Jr.
*Attorney, Agent, or Firm*—Hovey, Williams, Timmons & Collins

[57] ABSTRACT

A display system for remote weather conditions includes a plurality of remote weather data collection stations and a base unit which polls the collection stations for the most recent weather data. Communication between the base unit and collection stations uses wireless signals on the same frequency. The base unit stores weather data from each station in a buffer from which display signals are provided to a broadcast television display. The base unit is operable to complete a polling cycle before the buffer for a given weather station is depleted of data.

7 Claims, 1 Drawing Sheet

Microfiche Appendix Included
(5 Microfiche, 283 Pages)

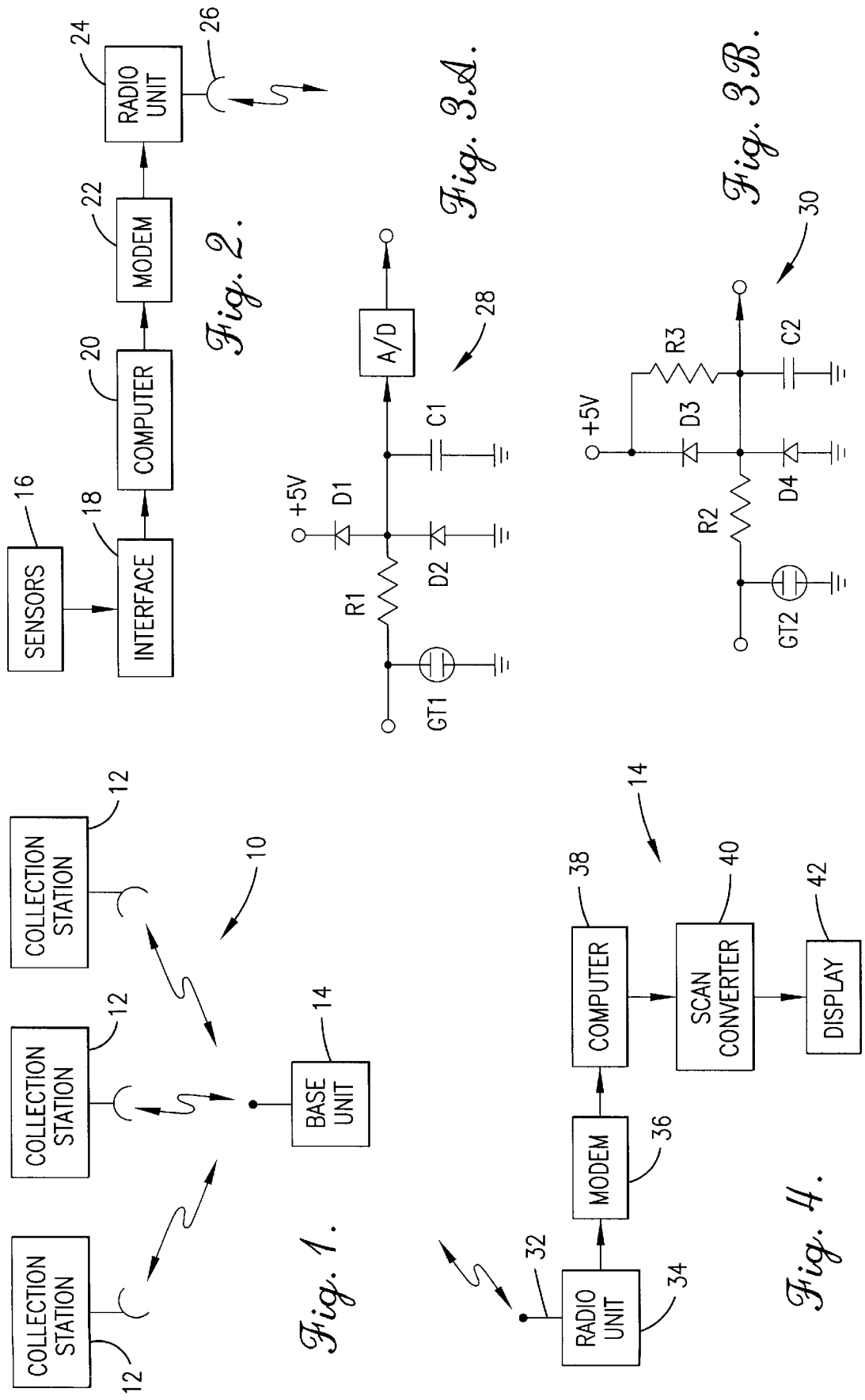

5,943,630

DISPLAY SYSTEM FOR REMOTE WEATHER CONDITIONS

RELATED APPLICATIONS

Not applicable.

FEDERALLY SPONSORED RESEARCH OR DEVELOPMENT

Not applicable.

MICROFICHE APPENDIX

A microfiche appendix as Appendix 1 containing a source code of a computer program useful in accordance with the present invention is appended hereto as 5 sheets of microfiche containing 283 frames.

BACKGROUND OF THE INVENTION

1. Field of the Invention

The present invention relates to the field of broadcast television display of remote weather data. In particular, the invention is concerned with a display system including a plurality of remote weather data collection stations and a base unit that polls the collection stations for the most recent weather data using wireless signals and then displays the data.

2. Description of the Prior Art

Local television news programs typically include a weather report indicating current weather conditions and a weather forecast. Over a given service area, the current weather conditions may vary. As a result, it is desirable to present current weather conditions for various locations in the service area. It is also desirable to display these weather conditions in a visually attractive manner.

In order to satisfy these objectives, one prior art system includes a central computer that communicates with remote data sensors over conventional telephone lines. If only one incoming telephone line is used, the central computer can access only one data sensor at a time. If multiple telephones lines are used, the operating costs of the system are substantially increased.

SUMMARY OF THE INVENTION

The present invention solves the prior art problems discussed above and provides a distinct advance in the state of the art. In particular, the weather data display system hereof enables the rapid collection of data from remote locations in a manner that is efficient and economical.

The preferred embodiment includes a base unit and a plurality of remote weather data collection stations. The base unit and the collection stations each include a radio transceiver. In operation, each collection station stores weather data representing weather conditions such as temperature, wind, humidity and precipitation. The weather data is stored in a data buffer reflecting a sequence of the most recent weather conditions. Each collection station has an associated identifier and responds to a polling signal from the base unit containing that identifier by transmitting a wireless signal containing the weather data in the buffer.

The base unit produces a series of display signals stored in a buffer and representative of the sequence of weather conditions. This series is provided to a television broadcast display. The base unit is operable to complete a polling cycle of all of the collection stations before all of the data in the buffer for a given station has been displayed. In this way, current data is available for display for each of the locations served by a collection station. Other significant aspects of the invention are discussed further herein.

BRIEF DESCRIPTION OF THE DRAWINGS

FIG. 1 is a block diagram illustrating the preferred display system of the present invention;

FIG. 2 is a block diagram illustrating the collection station of FIG. 1;

FIG. 3A is an electrical schematic of a portion of the interface of FIG. 2;

FIG. 3B is an electrical schematic of another portion of the interface of FIG. 2; and FIG. 4 is a block diagram of the base unit of FIG. 1.

DETAILED DESCRIPTION OF THE PREFERRED EMBODIMENT

FIG. 1 is a block diagram illustrating preferred display system 10 of the present invention. System 10 broadly includes a plurality of weather data collection stations 12 and base unit 14.

In the preferred embodiment, collection stations 12 are placed at selected locations throughout a service area. As illustrated in FIG. 2, each collection station 12 includes a set of weather condition sensors 16, interface 18, computer 20, modem 22, radio unit 24 and antenna 26.

In the preferred embodiment, sensors 16 include a wind speed and direction sensor such as Wind Monitor—AQ, Model No. 05305 available from R. M. Young & Company of Traverse City, Mich. This wind sensor provides analog voltage signals representative of wind speed and direction to interface 18. This preferred wind sensor is mounted on a mast which provides a convenient mounting site for the other sensors and components of collection station 12. Sensors 12 also include a relative humidity and temperature probe such as Model 41372VC/VF providing analog voltage signals representative of relative humidity and temperature to interface 18, and shielded by a radiation shield Model 41002 with both components available from the R. M. Young & Company. Computer 20 stores a history of barometric pressure readings in RAM for the last three hours at the top of each hour. This allows the three-hour trend of the pressure to be computed.

Sensors 12 also include a conventional precipitation sensor known as a "tipping bucket" that produces a switch closure at regular increments of rainfall. Switch closures are counted over time and precipitation can be measured by the number of closures. Each time an increment of precipitation is sensed, computer 20 notes the time since the last increment. If this time is more than a preset limit, e.g., 32 minutes, the current time is stored in the RAM and the precipitation time is marked as zero. If less than the preset time, the precipitation counter is incremented and the current time is stored for this increment. In this way, computer 20 stores in RAM the starting and ending times of a rain event and the amount as represented by the number of precipitation counts.

Interface 18 removes spurious electrical activity and protects computer 20 from damaging voltage levels. FIG. 3A is an electrical schematic representing analog interface circuit 28 for each of the sensors for wind speed, wind direction, humidity, barometric pressure and temperature. Circuit 28 includes gas tube GT1 (Model DSA-301LA-04) for providing protection against voltage surges, resistor R1 (1.5 K), diode D1 (IN4933), diode D2 (SA12ADICT), capacitor C1 (0.1 uF) and conventional analogto-digital converter A/D for providing a digital signal representative of the weather condition analog signal to computer 20, all connected as shown. The A/D converter is internal to computer 20.

FIG. 3B represents interface circuit 30 used as the interface between the precipitation sensor and computer 20. Circuit 30 includes gas tube GT2 (Model DSA-301LA-04), resistor R2 (330 ohms), resistor R3 (1.5 K), diode D3 (IN4933), diode D4 (SA50ADICT), and capacitor C2 (0.1 uF), all connected as shown.

Computer 20 is preferably a F68HC11 single board computer such as Model NMIX/T-0020-S1 available from New Micros, Inc. of Dallas, Tex. Computer 20 includes a microcontroller, ROM, RAM and real-time clock, all on a single printed circuit board. The ROM contains programming for the microcontroller and the RAM holds data until it can be transmitted and as temporary storage for the program in ROM. The real-time clock is used to time stamp events and to mark the high and low weather conditions for the current day. The microcontroller continuously records weather data representative of the weather conditions sensed by sensors 12. The weather data is stored in RAM and is transmitted on command from base unit 14. Microfiche Appendix I, incorporated as part of the disclosure hereof, presents source code for operating computer 20.

The serial port of computer 20 is connected to modem 22 which is preferably a terminal node controller (TNC) such as Model KPC-3 available from Kantronics of Lawrence, Kansas. Modem 22 is similar to a telephone modem in that it receives digital signals from computer 20 and converts them to tones suitable for radio transmission and similarly converts received tones to digital signals for use by computer 20.

Modem 22 is connected to radio unit 24 which is preferably an FM mobile radio unit (or transceiver) such as Kenwood Model TK-862(H). Preferred antenna 26 is a YAGI directional antenna aimed at base unit 14. Components 18–24 are preferably enclosed in a weather tight housing mounted to the mast of the wind sensor.

As illustrated in FIG. 4, base unit 14 includes antenna 32, radio unit 34, modem 36, central computer 38, scan converter 40 and display 42. Antenna 32 is preferably an omni-directional antenna connected to radio unit 34 and from there to modem 36. Unit 34 and modem 36 are preferably the same models as used with collection stations 12. Antenna 32, radio unit 34 and modem 36 may be located remotely from central computer 38. If such is the case, a telephone line can provide an interconnection using a telephone modem at each end.

Central computer 38 is preferably an off-the-shelf personal computer such as a PENTIUM-based P.C. running at 133 MHZ. Computer 38 provides a display output from the monitor connector to conventional scan converter 40 which converts the computer VGA signals to NTSC signals for broadcast television.

In preferred forms, the display output is presented as a series of display signals corresponding to a sequence of weather conditions received as weather data from collection stations 12. A buffer, internal to central computer 38, stores a user selectable amount of data, commonly selected as about two minutes, for each collection station 12. Data for the selected station 12 is timed out from the buffer at the rate of one set of data per second to display 42, representing a television display which may include intermediate broadcast.

In the operation of a collection station 12, computer 20 continuously samples input representative of current weather conditions from all of sensors 12 except for the precipitation sensor, which only provides an input when an increment of precipitation is sensed. Computer 20 samples and stores in its RAM the input for wind speed and wind direction every second. Temperature, humidity and pressure are sampled each second, but stored only if these conditions represent an extreme high or low for the day, or upon receipt of a polling signal in order to provide current conditions. Over time, the stored weather data represents a sequence of weather conditions.

The RAM of computer 20 is configured to include two data buffers: the current buffer and the next buffer. Weather data is stored in the current buffer on a first-in, first-out basis. The current buffer also includes the historical information concerning precipitation and pressure, along with the highest and lowest temperatures for the current day. Upon receiving a polling command from base unit 14, the data in the current buffer is transmitted. Upon receiving an acknowledgment bit in the next polling signal, computer 20 switches to the next buffer which then becomes the current buffer and the data from the previous current buffer deleted.

Computer 20 is programmed to respond to certain commands and base unit 14, that is, computer 38 is programmed to transmit selectively these commands. In particular, commands from base unit 14 are received one byte at a time and as each is received, computer 20 checks to determine whether this byte is a start of a command. If so, successive bytes are stored until the "end" byte is received indicating the end of the command. The length of the received command is compared with the expected length. If not equal, the command is ignored. If the command lengths are equal, an identifier, preferably an address contained in the command, is compared to the address or identifier previously assigned to that particular collection station 12. If there is no match, the command is ignored. If there is a match, the command is implemented.

The preferred commands and actions include the following:

synchronize—delete any stored wind speed and wind direction data and start recording new wind data;

send summary—send recorded extremes for the day for temperature, pressure and wind and precipitation events;

send data—send all data in current buffer;

set summary—set the recorded extremes and temperature conditions to the values contained in the command;

reset summary—initialize the recorded extremes;

send time—send the current time as indicated by the real time clock;

set time—send the real time clock to the time contained in the command;

send ROM version—send the version of the software currently in ROM; and reset computer—reboot computer 20.

In the preferred embodiment, radio units 24 for collection stations 12 and radio unit 34 for base unit 14 all transmit and receive on the same frequency. This provides for economical equipment costs. Because of this, base unit 14 transmits one polling signal at a time with each polling signal containing the address of a selected collection station 12. Also, base station 14 is programmed to delay the transmission of a subsequent polling signal until a response is received to the previous polling signal, except for those commands for which no response is needed.

In typical operation, base station 14' transmits a "synchronized" command to each collection station 12 that prompts all stations 12 to begin recording new wind data. A "send summary" command is then transmitted to each station 12 in sequence with a delay between each command for response.

When weather data is needed, base unit 14 transmits the "send data" command to each station 12 in turn. The order in which stations 12 are polled is a matter of operator choice. In addition, the operator may choose to poll only selected ones of stations 12. In operation, a polling cycle can be completed in less than two minutes. This allows refreshing of data buffer in computer 38 for each weather station 12 before the data therein has been emptied for display. In general, the polling cycle with the "send data" command is repeated continuously to provide base unit 14 with the most current weather data. Base unit 14 transmits the other commands as needed.

In preparation for a local weather television broadcast, the operator enters identification of collection stations 12 from which data will be required. Base station 14 transmits a "synchronize" command to all of the selected stations 12. This deletes any stored wind data in stations 12 so that they begin collecting only current data.

Next, base unit 14 transmits the "send summary" command to each station 12 in sequence. As each station 12 responds, computer 38 decodes each data stream and places the data in the corresponding buffer location in buffer 42. If a particular station 12 fails to respond to three "send summary" commands, this station is removed from the set of selected stations.

After selected stations 12 have responded to the "send summary" command, base unit 14 polls each selected station 12 by transmitting the "send data" command, and each station 12 responds in sequence by sending current data to base station 14. As computer 38 receives the stream of weather data from each station 12, computer 38 prepares the acknowledgment value for the next transmission that will cause each station 12 to shift to the "next" buffer. Computer 38 decodes the weather data from each station and stores the data in the appropriate data buffer locations including wind data, which has been sampled once per second since the last "synchronize" or "send data" command. The "send data" polling cycle is repeated until the end of the weather report broadcast.

In computer 38, the data buffer contains data defining the graphic weather display for display 42, and also contains the weather data for the display for each station 12. Also, for each station 12, the wind data buffer holds 120 seconds worth of data, for example, which represents 120 wind direction and speed samples. When the wind buffer is full, each new weather data causes removal of the oldest weather data. This buffer time of two minutes is normally more than sufficient to complete a polling cycle. If the wind data buffer becomes empty, however, data from the previous 120 seconds is reused to maintain visual integrity on display 42. That is, the graphic on display 42 continues to present a wind speed and direction graphic that changes frequently (once per second) with each wind change. This presents a dynamic and lively visual effect.

In the preferred embodiment, a set of display graphics are predefined in the software, but the user also has the option of defining and entering new display graphics. In addition, the weather broadcast journalist can use a hand held switch to move through a sequence of graphics but can include graphics for selected weather stations 12. In the alternative, a specific graphic can be selected by keyboard entry.

Having thus described the preferred embodiment of the present invention, the following is claimed as new and desired to be secured by Letters Patent:

1. A weather data collection apparatus comprising:
   a plurality of weather data collection stations each including
      means for sensing weather conditions selected from the group consisting of temperature, wind speed, wind direction, relative humidity, barometric pressure and precipitation,
      means for storing weather data representative of said weather conditions, and
      means for receiving and responding to a wireless polling signal containing an identifier for transmitting a wireless weather data signal representative of said weather data with each of said weather stations responding to a different identifier; and
   a base unit including means for regularly and selectively transmitting polling signals in predetermined sequence to selected ones of said weather stations and for receiving weather data signals therefrom, and including means for selectively producing a display output as NTSC display signals representative of said weather data, said polling signals and said weather data signals being at the same frequency.

2. A weather data collection apparatus comprising:
   at least one weather data collection station including means for sensing weather conditions and means for storing weather data representative thereof and including means for receiving a wireless polling signal and responsive thereto for transmitting a wireless weather data signal representative of said weather data; and
   a base unit including means for selectively transmitting said polling signal and for receiving said weather data signal and including means for producing a display output representative of said weather data,
   said weather data representing a sequence of weather conditions, said base unit including means for producing said display output as a series of display signals respectively representing said weather conditions in sequence,
   said base unit further including means for transmitting a succession of polling signals in order to receive corresponding weather data representative of successive sequences of weather conditions,
   further including a plurality of said collection stations, each of said stations having an associated identifier and including means for responding only to a polling signal containing said associated identifier, said base unit including means for polling a selected collection station by transmitting a polling signal containing the identifier of said selected collection station,
   said weather data representing a sequence of weather conditions for each of said collection stations, said base unit including means for storing said weather data in a data buffer and for producing said display output from said data buffer as a series of display signals respectively representing said weather conditions in sequence, said base unit further including means for regularly polling selected ones of said collection stations in turn and for completing the polling before completion of said series of display signals for a given one of said collection stations in order to refresh the weather data in said data buffer before depletion thereof.

3. The apparatus as set forth in claim 2, said collection stations and said base unit receiving and sending wireless signals at the same frequency.

4. The apparatus as set forth in claim 2, said collection stations each including a directional antenna aimed at said base unit.

5. The apparatus as set forth in claim 2, said weather conditions including at least one selected from the group consisting of temperature, wind speed, wind direction, relative humidity, barometric pressure precipitation, and extremes and times thereof for a day.

6. The apparatus as set forth in claim 2, said base unit including means for providing said display output as NTSC display signals for broadcast display.

7. The apparatus as set forth in claim 2, said weather data including wind data, said base unit including a computer operable for producing said display output representative of said wind data on a first-in, first-out basis.

* * * * *